2,933,433
STABLE ANTI-PERSPIRANT STICK

W. Kedzie Teller, Riverside, and Elmer B. Tysdal, Batavia, Ill., assignors to Pharma-Craft Company, a division of Joseph E. Seagram & Sons, Inc., a corporation of Indiana No Drawing. Application December 10, 1956
Serial No. 627,125

4 Claims. (Cl. 167—90)

This invention relates to an improved perspiration inhibiting material and more particularly to such material in the form of a soap gel stick which contains sodium stearate, isopropyl myristate and/or isopropyl palmitate, and aqueous alcohol having distributed therein aluminum hydroxide gel as the perspiration inhibiting substance.

This invention contemplates incorporating comparatively low proportions of isopropyl myristate and/or isopropyl palmitate into a soap gel stick which contains a sodium stearate-aqueous alcohol gel base having aluminum hydroxide gel dispersed therein so as to impart enhanced physical stability to the stick without necessitating the aging of freshly prepared sticks. Thus, these esters enable a freshly prepared stick to be pushed in and out of a dispenser unit such as shown in copending Teller and Bernhardt application Serial No. 477,312, filed December 23, 1954, without crumbling.

Sodium stearate soap gel sticks have heretofore been known for various cosmetic purposes. These sticks are stable at normal atmospheric temperature ranges within certain known proportions of sodium stearate, alcohol and water. They are extremely desirable inasmuch as on contact with the skin, they have a pleasant cooling effect and do not leave a greasy or waxy residue.

However, the sticks are extremely sensitive to chemical reaction. The provision of a metal ion in a form free to react with sodium stearate to produce another metallic stearate will render the stick unstable if that ion is present in any substantial quantity.

Because of this consideration, it has heretofore been considered impossible to produce an anti-perspirant soap gel stick since known anti-perspirant chemicals include an ionizable form of a polyvalent metal, as for example, aluminum chloride.

The introduction of such a material into a soap gel stick of the form heretofore described results within a comparatively short time in a breakdown of the stick. This breakdown normally involves a loss of the stick form either by the forming of a mush or by formation of a multiphase system.

Aluminum hydrate gel, in spite of its nonacid character, has known remarkable high anti-perspirant qualities. When mixed with water and sodium stearate, however, a reaction occurs to form aluminum stearate. As pointed out in our copending application Serial No. 520,918, filed July 8, 1955, it has been discovered, however, that in spite of the normal ionic ability of the aluminum in aluminum hydroxide gel, when this material is enclosed in a sodium stearate gel stick, it does not so react and the stick is stable.

The precise reason for this lack of reaction is not known. It is presumably due to an ionization-depressing effect produced by the high concentrations of alcohol in the stick. It is not solely due to that factor, however, since other ingredients of the stick also appear to effect or add to this ionization depression. That is, the proportions of sodium stearate and alcohol and water and the aluminum hydroxide are all inter-related in this ionization depression.

One of the remarkable facts is, however, that so far as has been ascertained, the proportions of ingredients which will produce a stable sodium stearate stick coincide with the proportions which will sufficiently depress ionization to permit incorporation of aluminum hydroxide as the anti-perspirant ingredient.

We have discovered that 1.5–6% by weight of isopropyl myristate and/or isopropyl palmitate may be effectively incorporated into our aluminum hydroxide gel-containing soap gel stick when the ratio of sodium stearate to isopropyl myristate and/or isopropyl palmitate exceeds 1.75 to 1.

Aluminum hydroxide, $Al(OH)_3$, is available in a form sometimes referred to as "true" aluminum hydroxide, wherein it is suspended in water in a concentration of about 10% aluminum oxide by weight. In this form it has a gel-like consistency. The gel may be "dried" to heavier consistencies and almost to apparent dryness to the touch without removing any of the water of combination by various well known techniques in which uncombined water is removed. In such "dried" form it still retains its identity as "true" aluminum hydroxide. In the following specifications and claims the aluminum hydroxide used in the practice of this invention will be identified as "aluminum hydroxide gel" since it may be used in any concentration with appropriate adjustment of quantities of other liquids and especially of water, which may be used. As is customary in connection with aluminum hydroxide in any such form the concentration or quantities thereof will be expressed in terms of aluminum oxide ($Al_2O_3$).

It is believed to be a particular advantage of our composition in that it affords a slightly alkaline stick-type product having both deodorant and anti-perspirant qualities. In contract with this, many of the anti-perspirant compositions available to the public are acid to a varying degree and none of them is in the form of a stick having a soap-gel base.

In the practice of the present invention a typical soap gel containing isopropyl myristate and/or isopropyl palmitate may be formed and melted and a useful quantity of aluminum hydroxide gel may then be stirred into the melted gel. The resultant product, upon cooling, is stable when stored in a closed container and at normal room temperature. Also, the ingredients of our soap gel may be mixed together at an elevated temperature, and useful quantities of aluminum hydroxide gel may thereafter be distributed therein. Upon cooling the soap gel will solidify apparently without any adverse effects flowing from the presence of the aluminum hydroxide. The resulting product is similarly stable. Also the composition may have incorporated therein moisture retaining substances and perfumes. Furthermore, in accordance with the examples set forth hereinbelow, a composition may be prepared with a soap gel and aluminum hydroxide gel in useful quantities to serve as anti-perspirant and, in addition, there may be incorporated recognized deodorant materials, for example, a dihydroxy halogenated diphenyl methane, such as the widely used hexachlorophene. The resultant stick-type product is similarly stable and exhibits unusual qualities for the reduction in quantity of perspiration as well as preventing the development of odor.

Ethyl alcohol is preferred as the alcohol because of its acceptance in products of this general type. Other suitable volatile alcohols may be used. For example, isopropyl or polyhydric alcohols or mixtures thereof with ethyl alcohol may be used and are to be included in the term "alcohol" employed in the following examples and claims. Also within the term "alcohol" is a mixture of one or more volatile alcohols with not more than an equal volume of propylene glycol. Water which may be present as a part of the aluminum hydroxide gel or which may be added in relatively small quantities will serve to control the rate of evaporation and thus to establish the desired cooling effect when applied to the person. It is important for the product of this invention that the soap gel consist primarily of soap and alcohol and it will be so described in the claims. The relative proportions between quantities of soap, alcohol and water, if the latter is used, are merely so chosen as to provide a final stick product having firmness and cooling effect within relatively wide ranges of personal preference. The specified quantities of optional additives such as perfumes, deodorant materials or moisture retention agents of which Carbitol (diethyleneglycol ethyl-ether) is an example, although preferred for practical reasons and suitabe for the particular materials named, are not critical to the present invention.

In the following examples a typical useful quantity of aluminum hydroxide gel will be set forth. It is believed that the range of quantity in which this substance may be added is limited only by practicality. That is to say, if only two parts by weight per hundred of the final product consist of aluminum hydroxide gel (10% $Al_2O_3$), the anti-perspirant qualities would be very slight. However, useful anti-perspirant qualities are exhibited with as little as five parts per hundred and an exceedingly effective product is achieved by the use of about ten parts per hundred. Increase in quantity above ten parts per hundred to about twenty parts per hundred does not sensibly increase the desired anti-perspirant effect although it should be stated that such larger quantities bring about no unfavorable reaction upon the stability of the end product. Accordingly, in the claims the quantity of aluminum hydroxide gel will not necessarily be stated in terms of precise proportions but rather will be set forth as a useful quantity.

EXAMPLE I

An anti-perspirant stick is prepared from the following ingredients. Relative proportions are set forth as parts per hundred by weight.

| | Parts by weight |
|---|---|
| Hexachlorophene | 0.23 |
| Alcohol | 67.70 |
| Sodium stearate | 6.77 |
| Carbitol | 1.35 |
| Isopropyl myristate | 1.81 |
| Water | 12.68 |
| Aluminum hydroxide gel (10% $Al_2O_3$) | 9.05 |
| Perfume | 0.41 |

The alcohol, hexachlorophene, Carbitol, isopropyl myristate, sodium stearate and about one-half of the water may be mixed, heated to 70° C. and maintained at 70° C. until the sodium stearate is completely dissolved. The other one-half of the water is carefully added to the aluminum hydroxide gel while stirring to form a smooth mixture. The diluted aluminum hydroxide gel is then added to the mixture in which the sodium stearate is dissolved and the resultant mixture is stirred constantly for about fifteen minutes during which the temperature is permitted to drop to from 62° to 65°. The perfume is added just before pouring into molds. The final mixture is poured at the temperature of from 62° to 65° C. into cold (room temperature) molds. Preferably the molds are of size and shape to form a plurality of individual sticks which may be removed from the molds when cooled and packaged for sale. For example the individual sticks may be cylindrical in form and of a size suitable for convenient use. Furthermore, the product may be poured into molds consisting of elements of the package in which the product is to be sold as disclosed in copending application Serial No. 477,312, filed December 23, 1954, by Bernhardt and Teller.

The order in which the isopropyl myristate is added to the composition is not critical.

It is important that the mixture be stirred frequently or constantly after the aluminum hydroxide gel has been added and until the mixture has cooled to the temperature range set forth. In this manner the aluminum hydroxide gel is maintained thoroughly distributed in the mixture. Stirring may be continued during pouring for the same purpose. The product will harden quickly in the relatively cool molds due to solidification of the soap gel base. The finished product is stable and needs only to be packaged in an airtight fashion to prevent evaporation of the alcohol and water to have adequate shelf life for normal channels of distribution. The finished product has been subjected to extensive tests which amply demonstrate highly desirable anti-perspirant and deodorant qualities.

EXAMPLE II

An anti-perspirant may be made from ingredients set forth in Example I except that isopropyl palmitate may be substituted for isopropyl myristate. The procedure may be the same as therein set forth. The final product has highly desirable anti-perspirant qualities.

EXAMPLE III

The particular order of addition of the ingredients set forth in Examples I and II may be varied without apparent effect on the final product. Thus, the products of Examples I and II may be prepared by mixing the sodium stearate with the aluminum hydroxide gel and thereafter adding such mixture to the alcohol, isopropyl myristate and/or isopropyl palmitate, and water. The optional ingredients such as moisture retention agents, deodorants and perfumes may be added in any order although it is preferred for economical reasons to add the perfume just before pouring. Preferably, for the purposes of this example, the aluminum hydroxide gel is in the form of a suspension in water in a concentration equivalent to 10% $Al_2O_3$ and it may be further diluted with water before mixing with the sodium stearate to facilitate dissolution of the sodium stearate.

It is recognized, of course, that the term "sodium stearate" is used commercially to apply to the sodium salt of a mixture of fatty acids of which stearic acid and palmitic acid predominate with relatively small proportions of closely related fatty acids. The term is used here in its commercial sense. The alcohol referred to is preferably ethyl alcohol or isopropyl alcohol.

Table I, infra, shows the indicated limits of the primary constituents of the sodium stearate soap gel stick.

Table I

| | Percent by weight |
|---|---|
| Alcohol (95%) | 56–87 |
| Water | 4–45 |
| Sodium stearate | 4–12 |
| Aluminum hydroxide gel (10% $Al_2O_3$) | 2–14 |
| Isopropyl myristate[1] or isopropyl palmitate | 1.5–6 |

[1] The ratio of sodium stearate to isopropyl myristate and/or isopropyl palmitate should exceed 1.75 to 1.

Table II, infra, shows the preferred limits of the primary constituents of our sodium stearate soap gel stick.

Table II

| | Percent by weight |
|---|---|
| Alcohol (95%) | 62–69 |
| Water | 12¼–17 |
| Sodium stearate | 6½–9⅓ |
| Aluminum hydroxide gel (10% $Al_2O_3$) | 5–13⅙ |
| Isopropyl myristate[1] or isopropyl palmitate | 1.5–6 |

[1] The ratio of sodium stearate to isopropyl myristate and/or isopropyl palmitate should exceed 1.75 to 1.

This application is a continuation-in-part of our copending application Serial No. 520,918, filed July 8, 1955, which in turn is a continuation-in-part of our copending application Serial No. 486,976, filed February 8, 1955, both now abandoned.

The foregoing detailed description has been given for clearness of understanding only, and no unnecessary limitations should be understood therefrom, as modifications will be obvious to those skilled in the art.

We claim:

1. A stable anti-perspirant stick comprising: a base having a sodium stearate-aqueous alcohol gel and, as a physical stabilizer, at least one member from the group consisting of isopropyl myristate and isopropyl palmitate; said base having about 4–12% by weight sodium stearate, about 4–45% by weight water, about 56–87% by weight alcohol, and about 1.5–6% by weight of said physical stabilizer wherein the weight ratio of sodium stearate to stabilizer exceeds 1.75 to 1; and about 2–14% by weight aluminum hydroxide gel dispersed in said base as an active anti-perspirant agent.

2. The stable anti-perspirant stick set forth in claim 1 wherein the physical stabilizer is isopropyl myristate.

3. The stable anti-perspirant stick set forth in claim 1 wherein the physical stabilizer is isopropyl palmitate.

4. A stable anti-perspirant stick comprising: a base having a sodium stearate-aqueous alcohol gel, an effective amount of aluminum hydroxide gel dispersed in said base as an active anti-perspirant agent and, as a physical stabilizer, about 1.5–6% by weight of at least one member from the group consisting of isopropyl myristate and isopropyl palmitate, the weight ratio of said sodium stearate to said stabilizer exceeding 1.75 to 1.

References Cited in the file of this patent

UNITED STATES PATENTS 2,087,162   Moore _____ July 13, 1937

OTHER REFERENCES

Pears: Perf. and Ess. Oil Record, 44:3, March 1953, pp. 84–90.

A. Boake, Roberts and Co., Std. ABRAC Works, Stratford, London E. 15, Tech. Infor. from ABRAC Ref: 144b, rec'd March 6, 1956, excerpts from bulletin (2 pp.).

UNITED STATES PATENT OFFICE

CERTIFICATE OF CORRECTION

Patent No. 2,933,433                        April 19, 1960

W Kedzie Teller et al.

It is hereby certified that error appears in the printed specification of the above numbered patent requiring correction and that the said Letters Patent should read as corrected below.

Column 2, line 25, for "specifications" read -- specification --; line 37, for "contract" read -- contrast -- column 3, line 18, for "suitabe" read -- suitable --; lines 28 and 29, for "exceedingiy" read -- exceedingly --.

Signed and sealed this 11th day of April 1961.

(SEAL)
Attest:

ERNEST W. SWIDER                       ARTHUR W. CROCKER

Attesting Officer                      Acting Commissioner of Patents